(12) United States Patent
Yaworsky et al.

(10) Patent No.: US 9,702,398 B1
(45) Date of Patent: Jul. 11, 2017

(54) RESTRICTED SWING ANGLE SOCKET ASSEMBLY

(71) Applicant: Federal-Mogul Motorparts Corporation, Southfield, MI (US)

(72) Inventors: Evan T. Yaworsky, Richmond Heights, MO (US); James J. Elterman, Byrnes Mill, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 0 days.

(21) Appl. No.: 15/057,703

(22) Filed: Mar. 1, 2016

(51) Int. Cl.
*F16C 11/06* (2006.01)
*B62D 7/16* (2006.01)

(52) U.S. Cl.
CPC .............. *F16C 11/06* (2013.01); *B62D 7/166* (2013.01)

(58) Field of Classification Search
CPC ........ B62D 7/16; F16C 11/06; F16C 11/0638; Y10T 403/32631; Y10T 403/32614; Y10T 403/32713; Y10T 403/32762; Y10T 403/32737; Y10T 403/32754; Y10T 403/32811
See application file for complete search history.

(56) References Cited

U.S. PATENT DOCUMENTS

| | | | | |
|---|---|---|---|---|
| 2,880,025 A * | 3/1959 | Herbenar | ............ | F16C 11/0604 403/133 |
| 3,090,642 A * | 5/1963 | Gottschald | .......... | F16C 11/0604 403/126 |
| 3,667,789 A * | 6/1972 | McNeely et al. | ... | F16C 11/0619 29/898.051 |
| 3,857,149 A * | 12/1974 | Hassan | .................. | B23P 11/00 29/898.043 |
| 4,613,251 A * | 9/1986 | Bellamy | ............. | F16C 11/0619 280/93.511 |
| 4,871,276 A | 10/1989 | Fister et al. | | |
| 6,413,003 B1 * | 7/2002 | Schmidt | ................... | B62D 7/16 403/120 |
| 6,439,794 B2 * | 8/2002 | Schmidt | ................... | B62D 7/16 403/120 |
| 6,454,484 B1 | 9/2002 | Parker et al. | | |
| 6,619,874 B2 * | 9/2003 | Paduano | ............. | F16C 11/0619 403/134 |
| 7,083,356 B2 * | 8/2006 | Paduano | ............. | F16C 11/0604 403/122 |

(Continued)

*Primary Examiner* — Daniel Wiley
(74) *Attorney, Agent, or Firm* — Robert L. Stearns; Dickinson Wright, PLLC

(57) ABSTRACT

The socket assembly includes a housing with an inner bore which extends between open first and second ends. A ball stud is partially disposed within the inner bore of the housing and includes shank, ball and protrusion portions with the shank portion extending out of the housing through the first end. A first bearing is disposed in the inner bore and includes a passage. The protrusion portion of the ball stud extends into the passage, and the passage is shaped to cooperate with the protrusion portion to allow the ball stud to rotate relative to said housing in one rotational direction by a greater magnitude than in another rotational direction. A cover plate closes the second open end of the housing, and a spring is disposed between the cover plate and the first bearing and biases the first bearing into contact with the ball portion of the ball stud.

18 Claims, 5 Drawing Sheets

(56) References Cited

U.S. PATENT DOCUMENTS 7,600,940 B1 * 10/2009 Byrnes ............... F16C 11/0623
                                                         403/131
8,342,769 B2 * 1/2013 Elterman ............... B62D 7/166
                                                         403/136

* cited by examiner

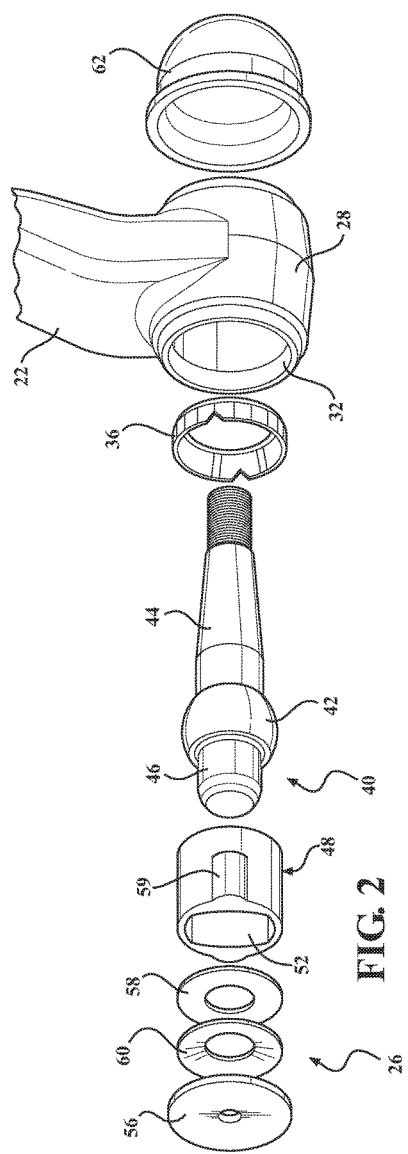
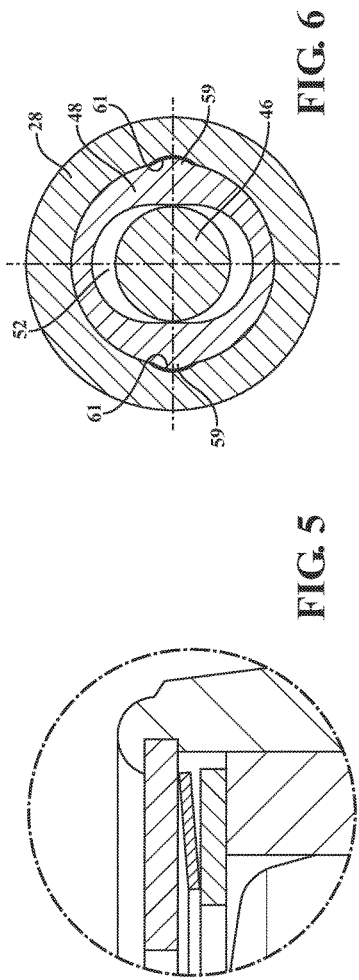

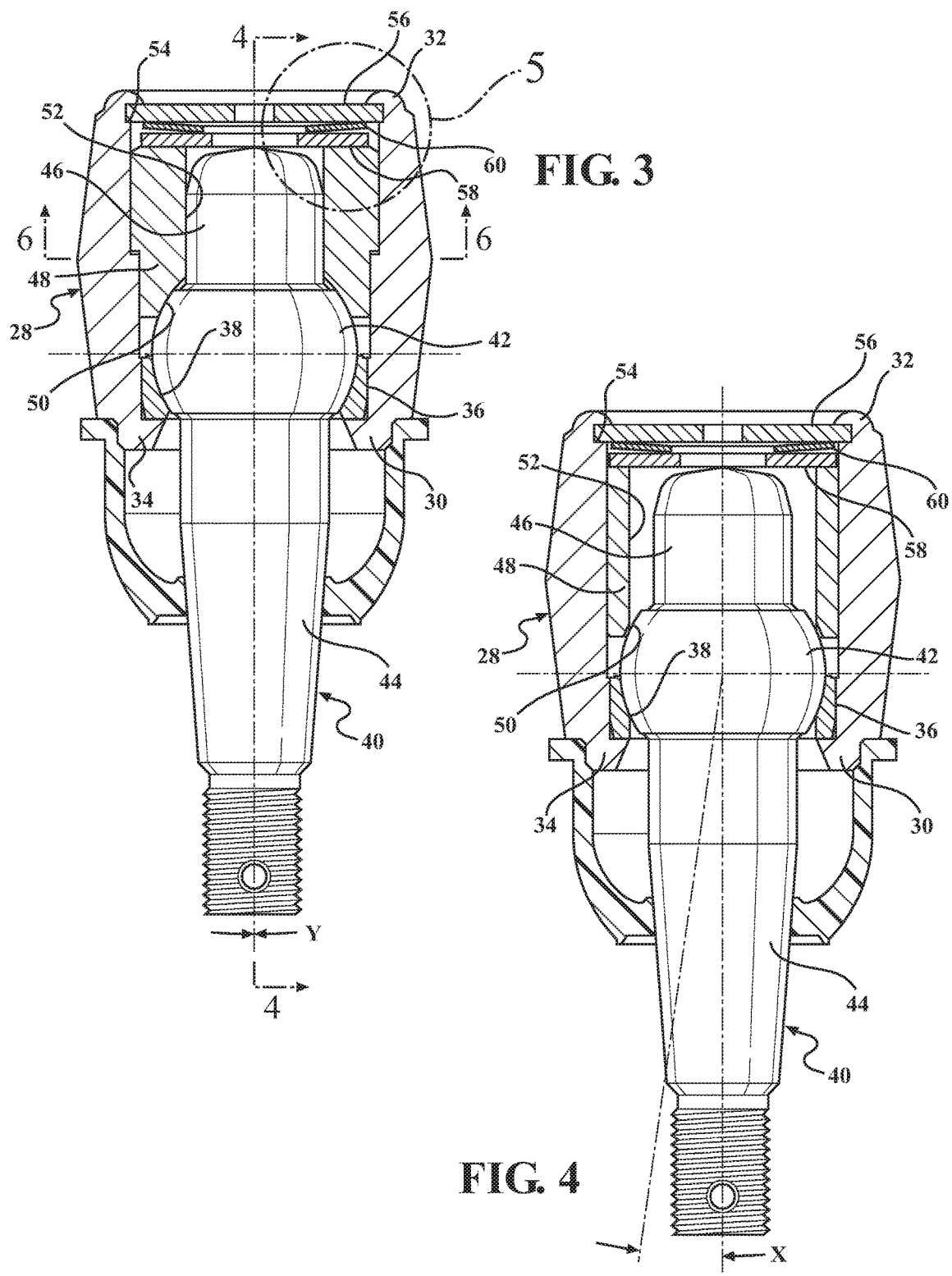

RESTRICTED SWING ANGLE SOCKET ASSEMBLY

BACKGROUND OF THE INVENTION

1. Field of the Invention

The present invention is related generally to socket assemblies and, more particularly, to socket assemblies that have a stud which is rotatable about one axis by a greater amount than about another axis.

2. Related Art

Conventional socket assemblies are used in a range of automotive and non-automotive applications. One such automotive application is in a tie rod end for transferring motion between a center link and a knuckle of a vehicle's steering system. Such socket assemblies generally include a housing, a ball stud with a semi-spherical ball head and one or more bearings for facilitating rotation of the ball stud relative to the housing. In typical socket assemblies, the ball stud is able to rotate relative to the housing, within pre-established confines, about three axes.

For certain truck applications, chassis component manufacturers have begun incorporating restricted swing angle socket assemblies, which are restricted from rotation about at least one of the axes, into tie rod assemblies for ensuring a proper alignment between steering linkage components. Such restricted swing axle socket assemblies typically include a preload device which biases one or more of the bearings into engagement with the ball studs. The preload devices are typically made of a rubber or thermoplastic material which may degrade over time. Such degradation could have a number of consequences including, for example, an inconsistent preload, looseness in the steering components, erratic vehicle dynamics and high stresses in critical steering and suspension components.

SUMMARY OF THE INVENTION AND ADVANTAGES

One aspect of the present invention is related to a socket assembly. The socket assembly includes a housing with an inner bore which extends from a first open end to a second open end. A ball stud is at least partially disposed within the inner bore of the housing and includes a shank portion, a ball portion and a protrusion portion with the shank portion extending out of the housing through the first open end. A first bearing is disposed in the inner bore of the housing and includes a passage. The protrusion portion of the ball stud extends into the passage, and the passage is shaped to cooperate with the protrusion portion to allow the ball stud to rotate relative to said housing in one rotational direction by a greater magnitude than in another rotational direction. A cover plate closes the second open end of the housing, and a spring is disposed between the cover plate and the first bearing and biases the first bearing into contact with the ball portion of the ball stud.

The socket assembly is advantageous because it may be manufactured cost effectively and provides improved durability over comparable assemblies that include a rubber or thermoplastic preload device. Specifically, the spring maintains robust and continuous surface-to-surface contacts between bearing surfaces and the ball portion of the ball stud during use and automatically adjusts to maintain those surface-to-surface contacts even as the ball portion and the bearing surfaces wear during the life of the socket assembly. This has the effect of maintaining a generally constant radial looseness and a generally constant axial looseness through the life of the socket assembly.

According to another aspect of the present invention, the passage of the first bearing has an oval or elliptical shape.

According to yet another aspect of the present invention, the socket assembly further includes a second bearing disposed on the inner bore of the housing and in sliding contact with the ball portion of the ball stud.

According to still another aspect of the present invention, the spring is a Belleville washer.

According to a further aspect of the present invention, the socket assembly further includes a spacer which is positioned between an upper surface of the bearing and the spring.

According to yet a further aspect of the present invention, the cover plate, spring and spacer have co-axial openings for conveying a lubricant into an interior of the socket assembly.

According to still a further aspect of the present invention, a lip on the housing at the second end is swaged or bent to capture the cover plate.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIG. 2 is an exploded view of the socket assembly of FIG. 1;

FIG. 3 is a first cross-sectional view of the socket assembly of FIG. 2;

FIG. 4 is a second cross-sectional view of the socket assembly of FIG. 2 and taken from a different view than FIG. 3;

FIG. 5 is an enlarged view of a portion of the socket assembly of FIG. 3;

FIG. 6 is another cross-sectional view of the socket assembly of FIG. 3;

DETAILED DESCRIPTION OF THE ENABLING EMBODIMENTS

Figure 1:
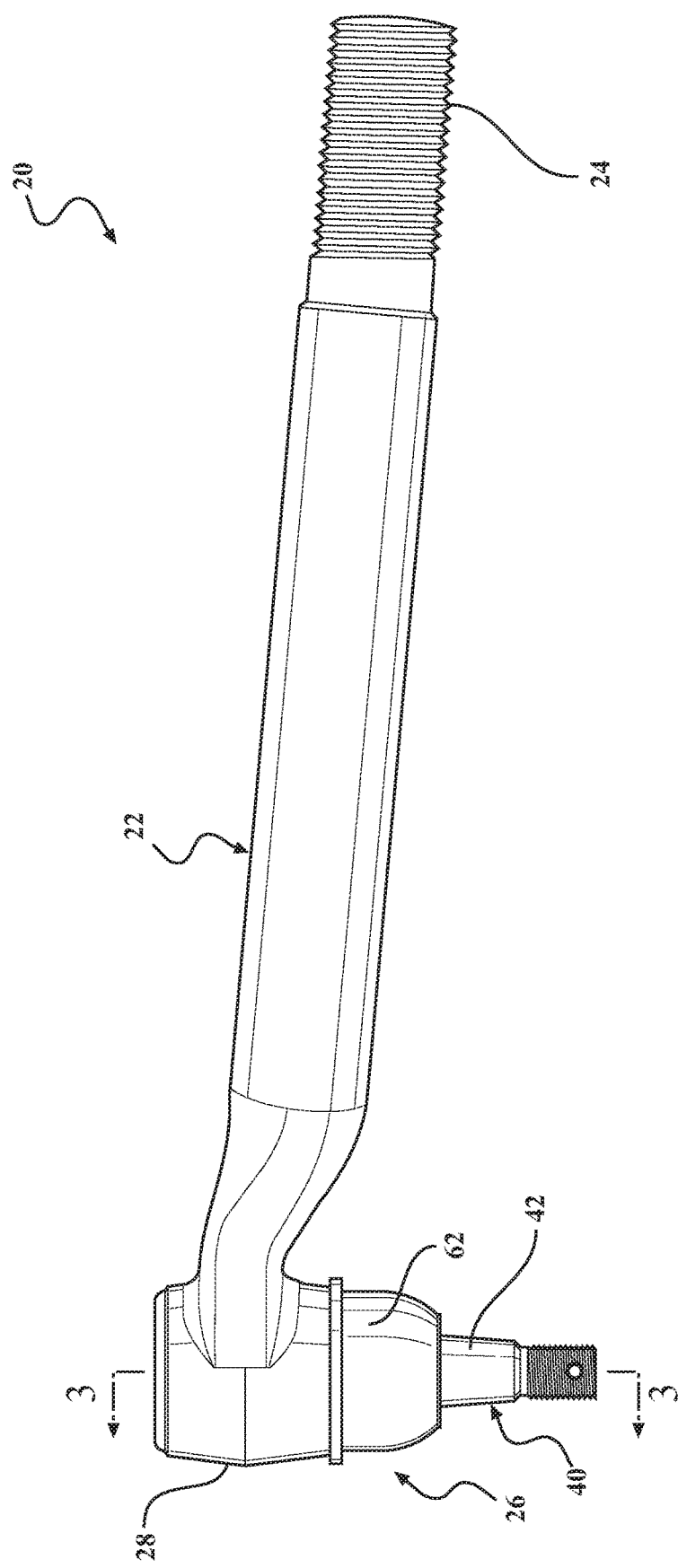
FIG. 1 is a front elevation view of a tie rod assembly including a first exemplary embodiment of a socket assembly.

Referring to the Figures, wherein like numerals indicate corresponding parts throughout the several views, an exemplary embodiment of a tie rod end assembly 20 for use in a vehicular steering system is generally shown in FIG. 1. The tie rod end assembly 20 includes a tie rod body 22 which extends from a threaded end 24 to a restricted swing angle socket assembly 26 for attachment with another component, such as a knuckle, of the steering system. Although the exemplary embodiment depicts the socket assembly 26 as being a part of a tie rod end assembly 20, it should be appreciated that the socket assembly 20 could be used in conjunction with a range of different automotive or non-automotive applications.

Referring now to FIGS. 2 and 3, the socket assembly 20 includes a housing 28 which is made as one integral piece with the tie rod body 22 and which includes a central bore that extends from a first open end 30 to a second open end 32. At the first open end 30, the housing 28 presents a radially inwardly extending flange 34. The housing 28 is preferably made of metal, such as, for example, cast iron, steel, alloy steel, aluminum, an aluminum alloy, etc. Rather than being incorporated integrally with the tie rod body 22 as is the case in the exemplary embodiment, the housing could alternately be a stand-alone cartridge which may be pressed into a tie rod body or any other suitable component or the housing could be integral with a component other than a tie rod body.

A lower bearing 36, which is generally annular in shape, is disposed in the open bore of the housing 28 adjacent the first open end 30 and is seated against the flange 34. Preferably, the lower bearing 36 is pressed into the open bore adjacent the first open end 30. The lower bearing 36 has a first bearing surface 38 which is semi-spherically curved and which faces radially inwardly and axially towards the second open end 32 of the housing 28. The first bearing surface 38 includes a plurality of grooves for distributing a lubricant around the first bearing surface 38. The lower bearing 36 is preferably made of one piece of metal but any suitable material may be employed.

The socket assembly 26 further includes a ball stud 40 which includes a ball portion 42, a shank portion 44 and a protrusion portion 46. The ball stud 40 is partially received within the bore of the housing 28 with the shank portion 44 projecting out of the housing 28 through the first open end 30 and with the ball and protrusion portions 42, 46 being disposed within the bore. In the exemplary embodiment, a distal end of the shank portion 44 is threaded for receiving a nut (not shown) to connect the ball stud 40 with the steering or suspension component of the vehicle. However, it should be appreciated that the ball stud 40 could be fixed with the steering or suspension component through any suitable means.

The ball portion 42 of the ball stud 40 is generally semi-spherical in shape with a curvature that matches the curvature of the first bearing surface 38 of the lower bearing 36 to allow the ball stud 40 to rotate relative to the lower bearing 36 and relative to the housing 28 during use. The protrusion portion 46 of the ball stud 40 is generally cylindrical in shape and extends from the ball portion 42 towards, but not all the way to, the second open end 32 of the housing 28.

The socket assembly 26 further includes an upper bearing 48 with a second bearing surface 50 that has a similar curvature to the ball portion 42 of the ball stud 40 and contacts an opposite hemisphere of the ball portion 42 from the lower bearing 36 for allowing the ball stud 40 to rotate relative to the upper bearing 48 and to the housing 28. The upper bearing 48 is preferably made as one integral piece of metal, such as, for example, steel, alloy steel, aluminum, an aluminum alloy, magnesium, etc. The second bearing surface 50 is preferably provided with a plurality of grooves for distributing the lubricant around the contact area between the upper bearing 48 and the ball stud 40.

The upper bearing 48 includes a passage 52 which is key-shaped and extends from one axial end of the upper bearing 48 to another for controlling the rotational movement of the ball stud 40 relative to the housing 28 during use. Specifically, the exemplary embodiment of the passage 52 is generally oval or elliptical in shape, and the protrusion portion 42 of the ball stud 40 extends into the passage 52. The passage 52 has a width which is similar to a diameter of the protrusion portion 46 and a length which is greater than the width to define the oval or elliptical shape. As shown in FIGS. 3 and 4, the shape of the passage 52 of the upper bearing 48 cooperates with the protrusion portion 46 of the ball stud 42 by allowing the protrusion portion 46 to slide within the passage 52 in a lengthwise direction of the passage 52 while restricting movement of the protrusion portion 46 in a widthwise direction of the passage 52. As such, the upper bearing 48 allows the ball stud 42 to rotate about a first axis or in a first rotational direction, which is identified in FIG. 4 as the X-direction, by a greater magnitude than about a second axis or a second rotational direction, which is identified in FIG. 3 as the Y-direction. As such, the socket assembly 26 is of the restricted swing angle type in that it allows the ball stud 40 to rotate by a greater magnitude in one rotational direction than in another rotational direction.

Figure 7:
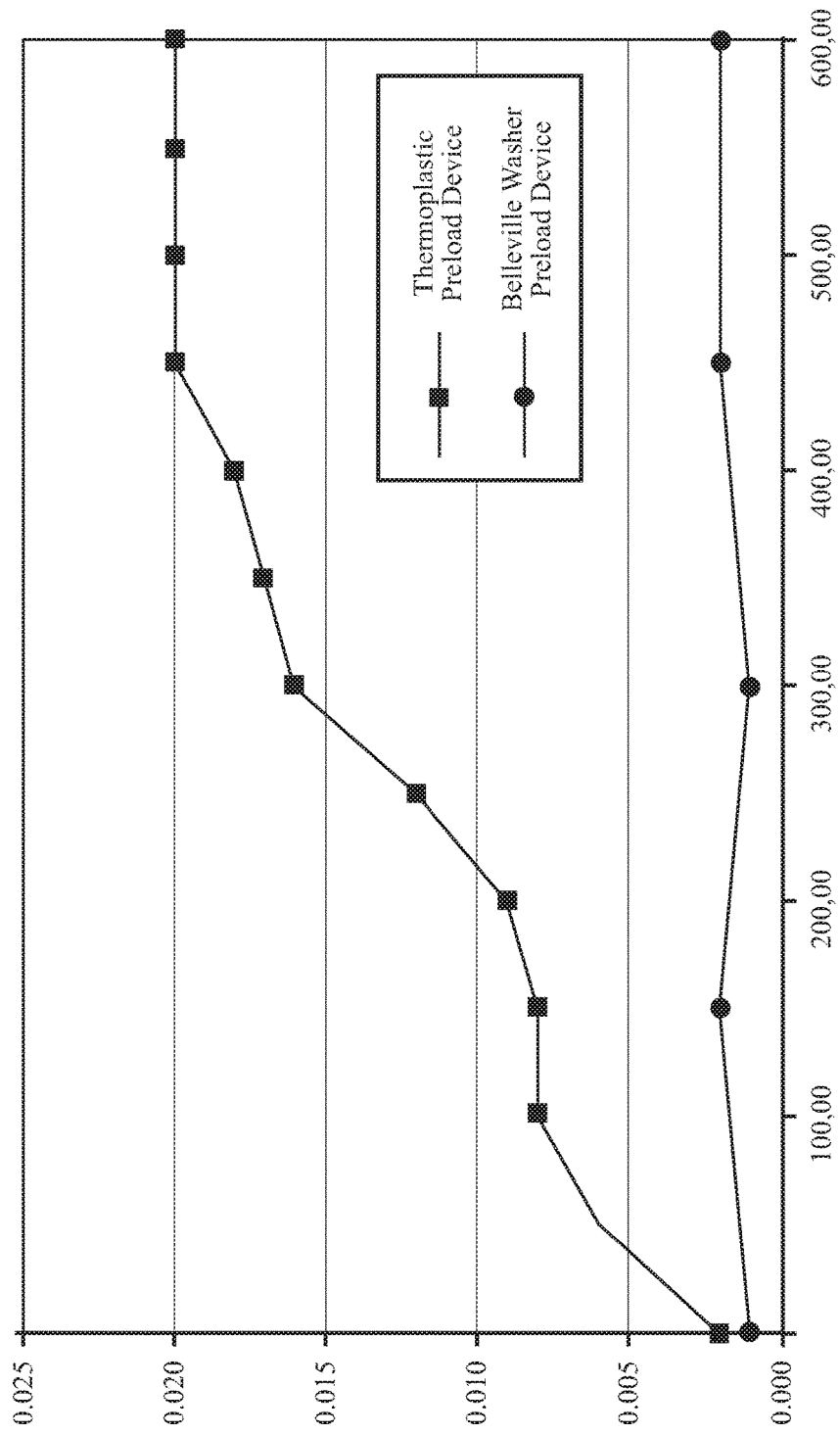
FIG. 7 is a chart showing axial looseness of the socket assembly of FIG. 1 in comparison to a socket assembly with a thermoplastic preload device.
Figure 8:
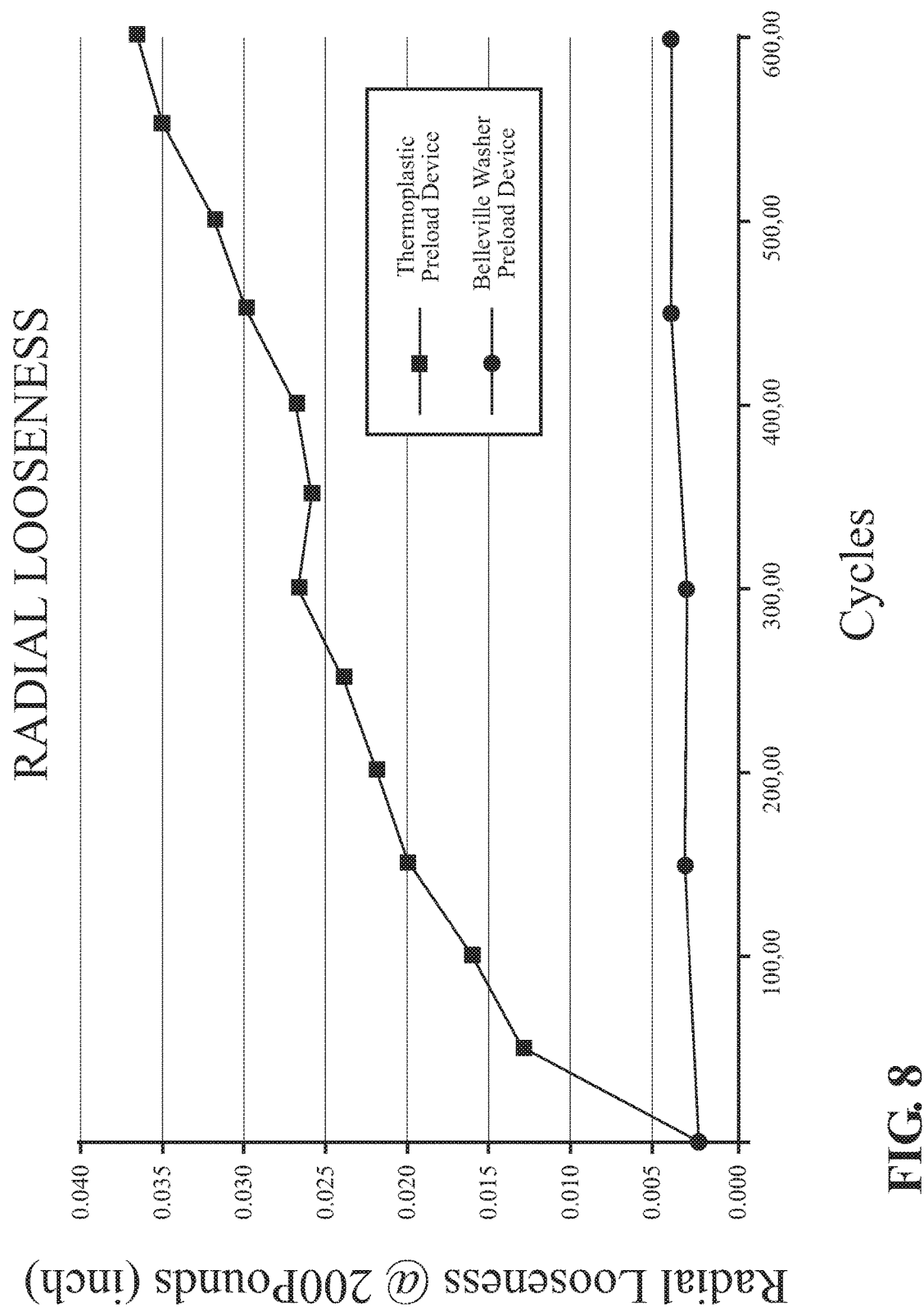
FIG. 8 is a chart showing radial looseness of the socket assembly of FIG. 1 in comparison to a socket assembly with a thermoplastic preload device.

Adjacent the first open end 30, the housing 28 presents a groove 54 which receives a cover plate 56 to close the first open end 30 of the housing 28. Between the upper bearing 48 and the cover plate 56, the socket assembly 26 includes a spacer 58 and a spring 60 for imparting a biasing force against the upper bearing 48 to bias the second bearing surface 50 of the upper bearing 48 against the ball portion 42 of the ball stud 40 for maintaining surface-to-surface contact between the second bearing surface 50 and the ball portion 42 of the ball stud 40 as the upper bearing 48 and the ball portion 42 wear during use. In the exemplary embodiment, the spacer 58 directly contacts an upper surface of the upper bearing 48, and the spring 60 is a Belleville washer 60 (also known as a washer spring) and is sandwiched axially between the cover plate 56 and the spacer 58. In use, the Belleville washer 60 minimizes looseness and maintains a consistent socket torque through the life of the socket assembly by compensating for wear in the lower and upper bearings 36, 48 and in the ball portion 42 of the ball stud 40. FIGS. 7 and 8 show that the axial and radial looseness respectively of the exemplary embodiment of the socket assembly 26 remain significantly lower over the life of the socket assembly 26 as compared to a socket assembly with a thermoplastic preload device.

As shown in FIG. 6, an outer surface of the upper bearing 48 is provided with a pair of diametrically opposite protrusions 59 which extend radially outwardly, and an inner surface of the housing presents a pair of diametrically opposite slots 61 that are shaped similarly to and operably receive the protrusions 59. As such aligning the protrusions 59 with the slots 61 during assembly establishes the correct orientation between the housing 28 and the upper bearing 48. Additionally, the configuration of the protrusions 59 being received in the slots 61 prevents undesirable rotation of the upper bearing relative to the housing 28 and vice versa during use.

As shown in FIGS. 3 and 4, the lower bearing 36 is preferably asymmetrical such that the first bearing surface 38 extends further in one direction than in another direction. Specifically, the first bearing surface 38 extends further in the orientation shown in FIG. 3 to further constrain the rotation of the ball stud 40 relative to the housing 28 in the Y-direction. In contrast, the first bearing surface 38 extends less far in the orientation shown in FIG. 4 to facilitate the rotation of the ball stud 40 relative to the housing 28 in the X-direction.

In the exemplary embodiment, the cover plate 56 is trapped in the groove 54 of the housing 28 by bending or swaging a lip at the second open end 32 of the housing 28 radially inwardly to trap the cover plate 56. However, it should be appreciated that the cover plate 56 could be connected with the housing 28 at the second open end 32 through any suitable means including, for example, a threading connection or a pressing operation.

The cover plate 56, Belleville washer 60 and spacer 58 all have co-axial openings for conveying a lubricant, such as grease, into the interior of the socket assembly 26 to re-lubricate the surface-to-surface contacts between the ball portion 42 of the ball stud 40 and the first and second bearing surfaces 38, 50 during maintenance of the socket assembly 26.

The socket assembly 26 also includes a dust boot 62 which is engaged with the housing 28 and with the shank portion 44 of the ball stud 40 for sealing the lubricant in the interior of the socket assembly 26 and for keeping contaminants out.

Another aspect of the present invention is related to a method of making a socket assembly 26, such as the socket assembly 26 shown in FIGS. 1-5. The exemplary method includes the step of preparing a housing 28 with an inner bore which extends from a first open end 30 to a second open end 32. The method proceeds with the step of inserting a lower bearing 36 with a first bearing surface 38 into the inner bore of the housing 28. Preferably, the lower bearing 36 is pressed into the inner bore. The method continues with the step of inserting a ball stud 40 with a ball portion 44, a shank portion 44 and a protrusion portion 46 into the inner bore of the housing 28 such that the shank portion 44 extends out of the inner bore through the first open end 30. The method proceeds with the step of aligning a pair of protrusions 59 on an upper bearing 48 with a pair of slots 61 on the inner bore of the housing 28 and inserting the upper bearing 48 into the inner bore, the upper bearing 48 having a passage 52 and wherein the protrusion portion 46 of the ball stud 40 extends into the passage 52 of the upper bearing 48. The passage 52 is shaped to cooperate with the protrusion portion 46 of the ball stud 40 to allow the ball stud 40 to rotate relative to the housing 28 in one rotational direction by a greater magnitude than in another rotational direction. The method proceeds with the step of inserting a spring 60, such as a Belleville washer 60, into the inner bore of the housing 28 to bias a second bearing surface 50 on the upper bearing 48 into surface-to-surface contact with the ball portion 42 of the ball stud 40. The method continues with the step of closing the second open end 32 of the housing 28 with a cover plate 56. The second open end 32 of the housing 28 could be closed by, for example, swaging a lip on the housing to engage the cover plate 56 or by pressing the cover-plate into a pre-formed groove in the inner bore of the housing.

It should be appreciated that the terms "upper" and "lower" as used herein with reference to the orientation of the socket assembly 20 in the Figures and are not intended to be limiting in nature or otherwise require that the socket assembly 20 have a particular orientation.

Obviously, many modifications and variations of the present invention are possible in light of the above teachings and may be practiced otherwise than as specifically described while within the scope of the appended claims.

What is claimed is:

1. A socket assembly, comprising:
    a housing with an inner bore which extends from a first open end to a second open end;
    a ball stud at least partially disposed within said inner bore of said housing and including a shank portion and a ball portion and a protrusion portion and said shank portion extending out of said housing through said first open end;
    a first bearing fabricated as a single piece of a rigid material and disposed in said inner bore of said housing, said first bearing including a bearing surface that is in surface-to-surface contact with said ball portion of said ball stud, and said first bearing including a passage, said protrusion portion of said ball stud extending into said passage, and said passage being shaped to cooperate with said protrusion portion to allow said ball stud to rotate relative to said housing in one rotational direction by a greater magnitude than in another rotational direction;
    a cover plate closing said second open end of said housing; and
    a spring disposed between said cover plate and said first bearing and biasing said first bearing into contact with said ball portion of said ball stud.

2. The socket assembly as set forth in claim 1 wherein said passage of said first bearing has an oval or elliptical shape.

3. The socket assembly as set forth in claim 1 further including a second bearing disposed in said inner bore of said housing and in sliding contact with said ball portion of said ball stud.

4. The socket assembly as set forth in claim 1 wherein said spring is a Belleville washer.

5. The socket assembly as set forth in claim 1 further including a spacer positioned between an upper surface of said first bearing and said spring.

6. The socket assembly as set forth in claim 5 wherein said cover plate and said spring and said spacer have co-axial openings for conveying a lubricant into an interior of said socket assembly.

7. The socket assembly as set forth in claim 1 wherein a lip on said housing at said second open end is swaged to capture said cover plate.

8. The socket assembly as set forth in claim 1 wherein said first bearing that is fabricated as a single piece is made of metal.

9. A tie rod assembly for a steering system of a vehicle, comprising:
    a one-piece tie rod body presenting a housing with an inner bore which extends from a first open end to a second open end;
    a ball stud at least partially disposed within said open bore of said housing and including a shank portion and a ball portion and a protrusion portion and said shank portion extending out of said housing through said first open end;
    a first bearing constructed as a single piece of a rigid material and disposed in said inner bore of said housing, said first bearing including a bearing surface that is in surface-to-surface contact with said ball portion of said ball stud and including a passage, said protrusion portion of said ball stud extending into said passage, and said passage being shaped to cooperate with said protrusion portion to allow said ball stud to rotate relative to said housing in one rotational direction by a greater magnitude than in another rotational direction;
    a cover plate closing said second open end of said housing; and
    a spring disposed between said cover plate and said first bearing and biasing said first bearing into contact with said ball portion of said ball stud.

10. The tie rod assembly as set forth in claim 9 wherein said passage of said first bearing has an oval or elliptical shape.

11. The tie rod assembly as set forth in claim 9 further including a second bearing disposed in said inner bore of said housing and in sliding contact with said ball portion of said ball stud.

12. The tie rod assembly as set forth in claim 9 wherein said spring is a Belleville washer.

13. The tie rod assembly as set forth in claim 9 further including a spacer positioned between an upper surface of said first bearing and said spring.

14. The tie rod assembly as set forth in claim 13 wherein said cover plate and said spring and said spacer have co-axial openings for conveying a lubricant into an interior of said socket assembly.

15. The tie rod assembly as set forth in claim 9 further including a dust boot sealed against said housing and said ball stud.

16. The tie rod assembly as set forth in claim 9 wherein said first bearing that is fabricated as a single piece is made of metal.

17. A method of making a socket assembly, comprising the steps of:
   preparing a housing with an inner bore which extends from a first open end to a second open end;
   inserting a ball stud into the inner bore of the housing, wherein the ball stud has a ball portion and a shank portion and a protrusion portion, and wherein the shank portion extends out of the inner bore through the first open end;
   inserting a bearing that is fabricated as a single piece of a rigid material into the inner bore of the housing, the bearing having a bearing surface in surface-to-surface contact with the ball portion of the ball stud a passage, the protrusion portion of the ball stud extending into the passage, and the passage being shaped to cooperate with the protrusion portion of the ball stud to allow the ball stud to rotate in one rotational direction by a greater magnitude than in another rotational direction;
   inserting a spring into the inner bore of the housing to bias the bearing into contact with the ball portion of the ball stud; and
   closing the second open end of the housing with a cover plate.

18. The method as set forth in claim 17 wherein the bearing that is made as a single piece is made of metal.

* * * * *